United States Patent
Ku et al.

(10) Patent No.: US 7,091,868 B2
(45) Date of Patent: Aug. 15, 2006

(54) PORTABLE LIQUID LEVEL DETECTOR

(75) Inventors: Chin Chung Ku, Taoyuan (TW); Chih-Kun Chen, Bade (TW); Chien-hui Lin, Taipei (TW)

(73) Assignee: Nanya Technology Corporation, Taoyuan (TW)

( * ) Notice: Subject to any disclaimer, the term of this patent is extended or adjusted under 35 U.S.C. 154(b) by 18 days.

(21) Appl. No.: 10/634,349

(22) Filed: Aug. 4, 2003

(65) Prior Publication Data

US 2004/0036618 A1 Feb. 26, 2004

Related U.S. Application Data

(62) Division of application No. 10/081,340, filed on Feb. 22, 2002, now abandoned.

(30) Foreign Application Priority Data

Dec. 28, 2001 (TW) ............................... 90133026 A

(51) Int. Cl.
G08B 21/00 (2006.01)
(52) U.S. Cl. ...................... 340/603; 340/606; 340/607; 340/608; 340/612; 340/618; 73/340 C
(58) Field of Classification Search ................ 340/603, 340/606, 607, 608, 612, 618; 73/340 C, 73/290 R
See application file for complete search history.

(56) References Cited

U.S. PATENT DOCUMENTS

| | | | | |
|---|---|---|---|---|
| 3,935,739 A | * | 2/1976 | Ells | 73/304 C |
| 4,799,174 A | | 1/1989 | Kramer et al. | 364/550 |
| 4,918,426 A | * | 4/1990 | Butts et al. | 340/611 |
| 5,017,909 A | | 5/1991 | Goekler | 340/620 |
| 5,166,667 A | * | 11/1992 | Jen | 340/606 |
| 5,699,049 A | * | 12/1997 | Difiore | 340/618 |
| 5,745,377 A | | 4/1998 | Power et al. | 364/509 |
| 5,832,772 A | | 11/1998 | McEwan | 73/290 R |
| 6,362,632 B1 | | 3/2002 | Livingston | 324/661 |
| 2003/0019367 A1 | * | 1/2003 | Fogagnolo et al. | 99/330 |

* cited by examiner

*Primary Examiner*—Julie Bichngoc Lieu
(74) *Attorney, Agent, or Firm*—Ladas & Parry LLP

(57) ABSTRACT

A portable liquid level detector. The detector comprises a portable casing, a power supply unit disposed in the portable casing, a sensing device coupled to the power supply unit to sense a capacitance within a container and to output a enable signal when a difference in the capacitance is detected, a light emission device coupled to the sensing unit that illuminates after receiving the enable signal, and an alarm device coupled to the sensing unit that sounds after receiving the enable signal.

12 Claims, 3 Drawing Sheets

PORTABLE LIQUID LEVEL DETECTOR

CROSS-REFERENCE TO RELATED APPLICATIONS

This patent application is a divisional application of U.S. Ser. No. 10/081,340, filed on Feb. 22, 2002, now abandoned, which claims priority to Taiwanese Application No. 90133026, filed on Dec. 28, 2001.

BACKGROUND OF THE INVENTION

1. Field of the Invention

The present invention relates to a portable liquid level detector, and method for detecting the level of a liquid in a container.

2. Description of the Related Art

In some semiconductor processes, liquid supply is necessary. For example, chemical slurries or the like used in chemical mechanical polish (CMP) processes require liquid provision. However, sometimes the container used to contain liquid is nontransparent, so that process engineer doesn't know how much liquid remains in the container. In this case, the process engineers sometimes estimate how much liquid remains in the container by knocking the container and listening to the corresponding sound from the container. But sometimes the process engineer's estimation is wrong, in which case the liquid supply may be interrupted, ruining semiconductor products. Another way to know how much liquid remains in the container is to use a flow measuring system to detect the weight of the container with liquid. However, the flow measuring system is not cheap. So, if a flow measuring system must be provided with every process that needs liquid supply, the cost is high.

SUMMARY OF THE INVENTION

The present invention achieves the above-indicated objects by providing a portable liquid level detector for determining the level of the liquid in the container. According to a first embodiment of the present invention, the portable liquid level detector is used to sense whether a capacitance within a container is changed and to output an enable signal. A light emission device illuminates and an alarm device sounds after receiving the enable signal, thereby the position of the liquid level in the container is identified.

According to a second embodiment of the present invention, the portable liquid level detector is used to determine a position of a clog within a pipe. A sensor is used to sense whether the clog is jammed in the pipe and to output an enable signal when the clog is detected by the sensor. A light emission device illuminates and an alarm device sounds, thereby the position of a clog within a pipe is identified.

The portable liquid level detector has portable casing, a power supply unit disposed in the portable casing, a sensor coupled to the power supply unit to sense whether a capacitance within a container is changed and to output a enable signal when a difference in the capacitance is detected, a light emission device coupled to the sensor that illuminates after receiving the enable signal, an alarm device coupled to the sensor that sounds after receiving the enable signal, a resistor coupled to the light emission device to limit a current flowing through the light emission device, and a switch coupled to the power supply unit to control an electrical conduction between the power supply unit and the sensor.

BRIEF DESCRIPTION OF THE DRAWINGS

The following detailed description, given by way of example and not intended to limit the invention solely to the embodiment described herein, will best be understood in conjunction with the accompanying drawings in which.

DETAILED DESCRIPTION OF THE PREFERRED EMBODIMENT

Embodiments of the present invention will be described below with reference to the drawings.

FIrst Embodiment

Figure 1:
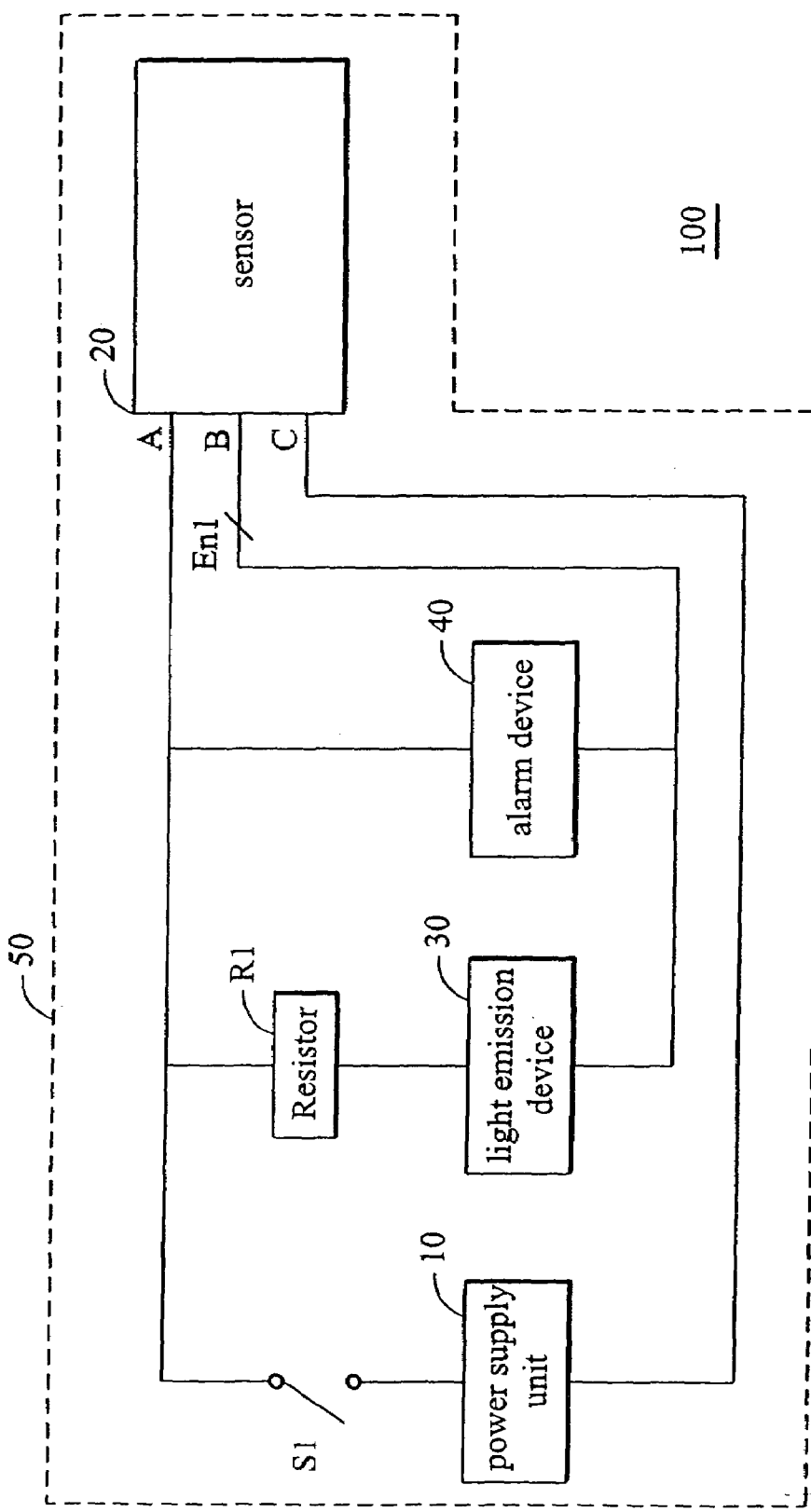
FIG. 1 shows the portable liquid level detector according to the present invention.

FIG. 1 shows a portable liquid level detector according to the present invention. The liquid level detector 100 is applied to determine the liquid level of a container (not shown). The liquid level detector 100 includes a portable casing 50 containing a power supply unit 10, a sensor 20 coupled to the power supply unit 10 to sense whether a capacitance within a container is changed and to output a enable signal En1 when the capacitance has changed, a light emission device 30 coupled to the sensor 20 to illuminate after receiving the enable signal En1, an alarm device 40 coupled to the sensor 20 to sound after receiving the enable signal En1, a resistor R1 coupled to the light emission device 30 to limit a current flowing through the light emission device 30, and a switch S1 coupled to the power supply unit 10 to control an electrical conduction between the power supply unit 10 and the sensor 20.

For convenience and portability, the power supply unit 10 is preferably a battery set. The light emission device 30 is preferably a light emission diode (LED) and the alarm device 40 is preferably a buzzer.

Figure 2:
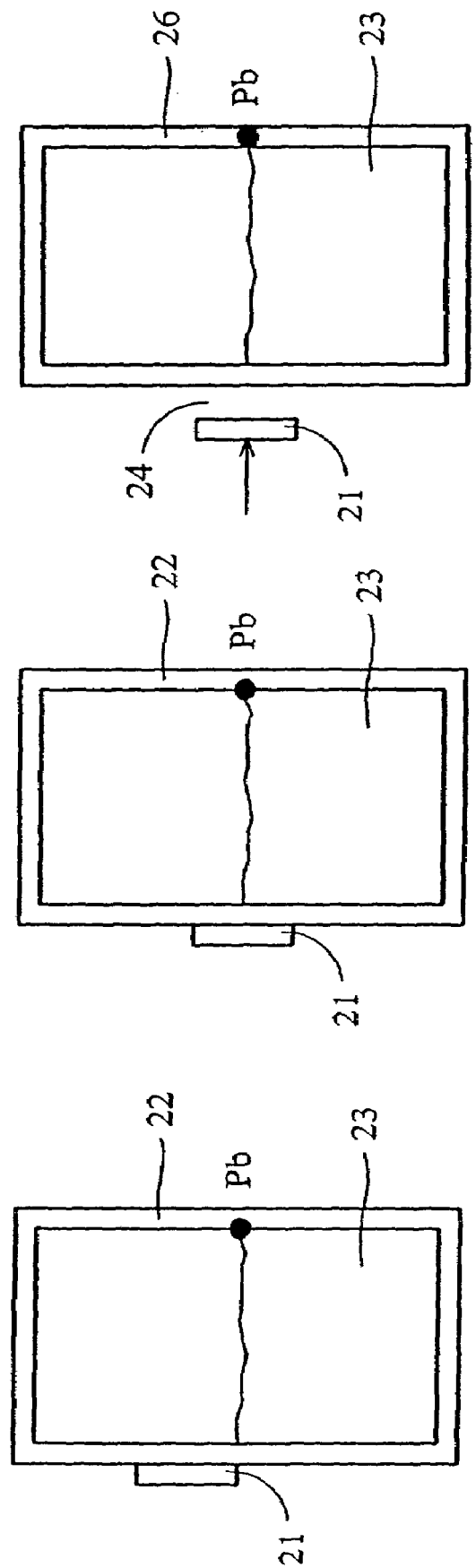
FIG. 2a~2C are schematic diagrams for illustrating the operation of sensor in the portable liquid level detector of the present invention.

FIG. 2a~2C are schematic diagrams for illustrating the operation of the sensor 20 in the portable liquid level detector 100 according to a first embodiment of the present invention. For example, the sensor 10 is a capacitive proximity switch, E2K-C25ME1 or E2K-C25ME2 made by the OMROM corporation. In FIG. 2a, a capacitive proximity switch 21 contacts a nonmetallic container 22 containing a target liquid 23. At this time, because the capacitive proximity switch 21 is above the position Pb of the liquid level, the capacitive proximity switch 21 doesn't detect the target liquid 23 in the container 22. Consequently, the capacitive proximity switch 21 doesn't not output an enable signal En1.

In FIG. 2b, the capacitive proximity switch 21 is brought into contact with the nonmetallic container 22 containing the target liquid 23, and then is moved downward to the position Pb of the liquid level. The capacitive proximity switch 21 detects a difference in the capacitance in the container 22, and then the capacitive proximity switch 21 outputs an enable signal En1. Namely, when the capacitive proximity switch 21 detects the target liquid 23 in the container 22, the capacitive proximity switch 21 outputs an enable signal En1.

Because the capacitance above the position Pb is different from capacitance below the position Pb, the capacitive proximity switch 21 can detect a difference in the capacitance.

In FIG. 2c, the capacitive proximity switch 21 is brought into proximity to but does not contact the metallic container 26 containing the target liquid 23. If the container 22 is composed of metallic materials, the capacitive proximity switch 21 operates by only being brought into proximity to the container 26 without contacting container 26. Similarly, the capacitive proximity switch 21 does not detect the target liquid 23 in the container 26 when the capacitive proximity switch 21 is above the position Pb of the liquid level. Consequently, the capacitive proximity switch 21 doesn't output an enable signal En1. When the capacitive proximity switch 21 is moved downward to the position Pb of the liquid level, the capacitive proximity switch 21 detects a difference in the capacitance in the container 22, and then the capacitive proximity switch 21 outputs an enable signal En1. Namely, whether the containers 22 and 26 are metallic or nonmetallic, once the capacitive proximity switch 21 moves through the position Pb, the capacitive proximity switch 21 can detect a difference in the capacitance. Consequently, the capacitive proximity switch 21 outputs the enable signal En1. The target 23 can be water, oil, plastics or chemical solutions, or another liquid.

Figure 3:
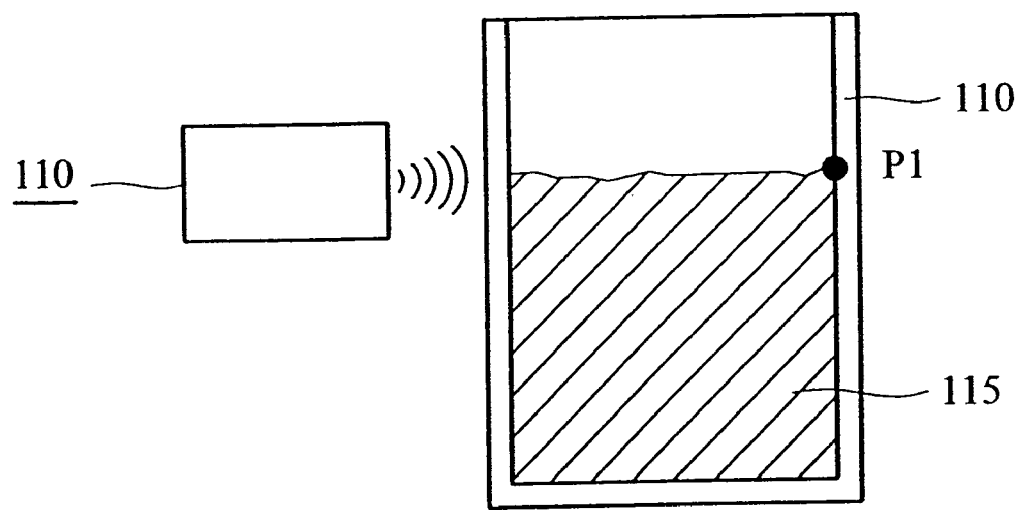
FIG. 3 is a schematic diagram for illustrating the operation of the first embodiment according to the present invention.

The operation of the liquid level detector 110 of the present invention will be described below in reference to FIG. 1 and FIG. 3. FIG. 1 shows a portable liquid level detector according to the present invention and FIG. 3 is a schematic diagram for illustrating the operation of the first embodiment according to the present invention.

First, the switch S1 is turned on such that the sensor 20 is electrically coupled to the power supply unit 10. Further, if the container 111 is composed of nonmetallic materials, the sensor 20 of the liquid level detector 110 is contacted with a container 111 and then the liquid level detector 110 is moved downward or upward. The sensor 20 outputs an enable signal En1, when the sensor 20 detects the liquid level P1 in the container 111 (a difference in capacitance in the container 111 is detected). The light emission device 30 and alarm device 40 are coupled to the sensor 20. The light emission device 30 illuminates and the alarm device 40 sounds after receiving the enable signal En1, such that the liquid level of the container 111 is identified.

Furthermore, if the container 111 is composed of metallic materials, the sensor is moved into proximity to the container 111 without contacting it. Then the liquid level detector 110 is moved downward or upward. The sensor 20 outputs an enable signal En1, when the sensor 20 detects the liquid level P1 in the container 111. The light emission device 30 illuminates and the alarm device 40 sounds after receiving the enable signal En1, such that the liquid level of the container 111 is identified.

Second Embodiment

The operation of the liquid level detector 110 according to the second embodiment of the present invention will be described below in reference to FIG. 1 and FIG. 4. FIG. 1 shows a portable liquid level detector according to the present invention and FIG. 4 is a schematic diagram for illustrating the operation of the second embodiment to detect a clog or jam in a pipe.

Figure 4:
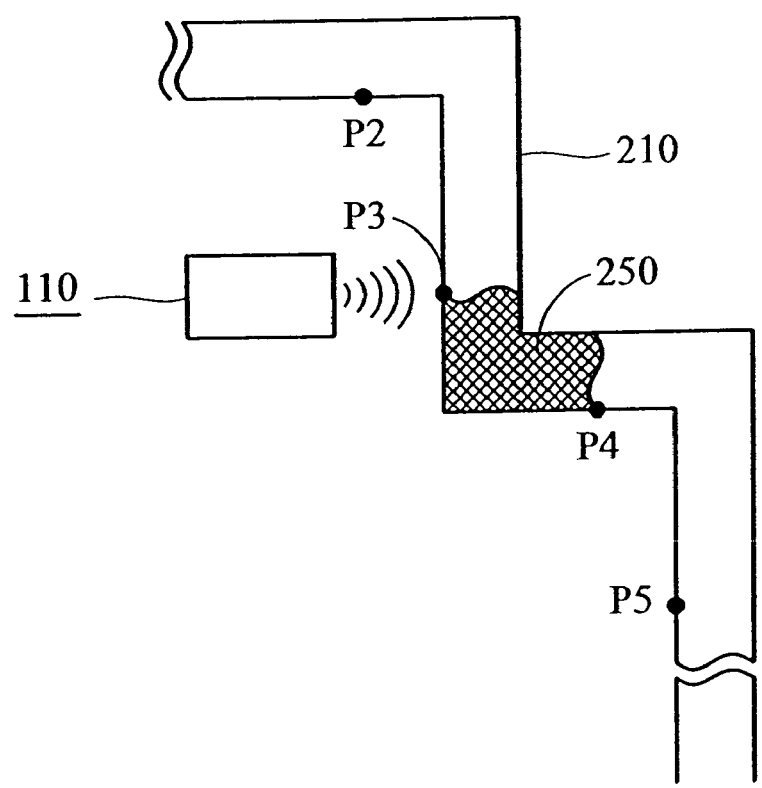
FIG. 4 is a schematic diagram for illustrating the operation of the second embodiment according to the present invention.

In FIG. 4, a clog 250 is jammed in a non-transparent pipe 210. If the container pipe 210 is composed of metallic materials, the sensor 20 of the liquid level detector 110 is moved into proximity to the pipe 210 without contacting it. Then the liquid level detector 110 is moved to position P3 from position P2 or to position P4 from position P5 along the pipe 210. The sensor 20 outputs an enable signal En1, when the sensor 20 detects the clog 250 in the pipe 210 (a difference in the capacitance in pipe 210 is detected). The light emission device 30 and alarm device 40 are coupled to the sensor 20. The light emission device 30 illuminates and the alarm device 40 sounds after receiving the enable signal En1, such that the location of the clog 250 in the pipe 210 is identified.

If the container 111 is composed of nonmetallic materials, the sensor 20 of the liquid level detector 110 is brought into contact the pipe 210. Then the liquid level detector 110 is moved to position P3 from position P2 or to position P4 from position P5 along the pipe 210. The sensor 20 outputs an enable signal En1, when the sensor 20 detects the clog 250 in the pipe 210 (a difference in the capacitance in pipe 210 is detected). The light emission device 30 and alarm device 40 are coupled to the sensor 20. The light emission device 30 illuminates and the alarm device 40 sounds after receiving the enable signal En1, such that the location of the clog 250 in the pipe 210 is identified.

The portable level detector of the present invention is convenient and cheap. The present invention uses a capacitive proximity switch to detect capacitance variation, and then outputs an enable so that a LED illuminates and a buzzer sounds, thereby identifying a liquid level position in a container.

Moreover, the portable level detector can also be used to detect the location of the clog in a nontransparent pipe. Wherever, the portable level detector can detect the level of the liquid in a metallic materials or a nonmetallic container.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of detecting a clog jammed in a pipe, comprising:
    moving a capacitive proximity switch along the length of a pipe wherein a pipe is jammed at an unknown location so as to sense whether a capacitance within a pipe is changed; and
    outputting an alarm signal to inform the location of the clog in the pipe when the capacitance has changed.

2. The method as claimed in claim 1, further comprising a step of outputting an enable signal to enable an alarm device to output the alarm signal.

3. The method as claimed in claim 1, wherein the alarm signal is output to turn on a light emission diode or a buzzer to inform the location of the clog in the pipe.

4. A portable pipe clog detector, comprising:
    a portable casing;
    a power supply unit disposed in the casing;
    a capacitive proximity switch coupled to the power supply unit and provided for being moved along the length of a pipe wherein a pipe is jammed at an unknown location so as to sense whether a capacitance within a pipe is changed and for outputting an enable signal when the capacitance has changed; and an alarm device coupled to the capacitive proximity switch to output an alarm signal after receiving the enable signal, wherein the location of the clog in the pipe is identified by the alarm signal.

5. The portable pipe clog detector as claimed in claim 4, wherein the alarm signal device is a buzzer.

6. The portable pipe clog detector as claimed in claim 4, wherein the alarm signal device is a light emission device.

7. The portable pipe clog detector as claimed in claim 6, further comprising a resistor coupled to the light emission device to limit a current flowing through the light emission device.

8. The portable pipe clog detector as claimed in claim 7, wherein the light emission device is a light emission diode.

9. The portable pipe clog detector as claimed in claim 4, wherein the power supply unit is a battery set.

10. A portable pipe clog detector, comprise:
a portable casing;
a battery set deposed in the portable casing;
a capacitive proximity switch coupled to the battery set and provided for being moved along the length of a pipe wherein a pipe is jammed at an unknown location so as to sense whether a capacitance within a pipe is changed and for outputting an enable signal when the capacitance has changed;
a light emission diode coupled to the capacitive proximity switch to illuminate after receiving the enable signal;
a buzzer coupled to the capacitive proximity switch to sound after receiving the enable signal, wherein the location of the clog in the pipe is identified by illumination of the light emission diode and sound of the buzzer;
a resistor coupled to the light emission diode to limit a current flowing through the light emission diode; and
a switch coupled to the battery set to control an electrical conduction between the battery set and the capacitive proximity switch.

11. The method as claimed in claim 1, wherein the pipe is a nontransparent pipe.

12. The method as claimed in claim 11, wherein the alarm signal is output to turn on a light emission diode or a buzzer to inform the location of the clog jammed in the nontransparent pipe.

* * * * *